(12) United States Patent
DeLucia

(10) Patent No.: US 7,520,140 B2
(45) Date of Patent: Apr. 21, 2009

(54) METHOD AND APPARATUS FOR REUSABLY CONTAINING FROZEN ICE CREAM, ICE POPS, AND THE LIKE

(76) Inventor: Mary C. DeLucia, 12 Woodland Ct., Wayne, NJ (US) 07470

( * ) Notice: Subject to any disclaimer, the term of this patent is extended or adjusted under 35 U.S.C. 154(b) by 317 days.

(21) Appl. No.: 10/445,280

(22) Filed: May 22, 2003

(65) Prior Publication Data

US 2004/0231356 A1 Nov. 25, 2004

(51) Int. Cl.
*F25D 3/08* (2006.01)

(52) U.S. Cl. .............................. 62/457.2; 62/371; 220/8; 220/666

(58) Field of Classification Search ................ 62/457.1, 62/457.2, 457.3, 457.6, 371, 530; 220/301, 220/9.1, 9.2, 8, 666; 215/12.1
See application file for complete search history.

(56) References Cited

U.S. PATENT DOCUMENTS

| | | | | |
|---|---|---|---|---|
| 2,263,632 A | * | 11/1941 | Kendall | 401/82 |
| 3,338,458 A | * | 8/1967 | Hultgren | 220/8 |
| 4,393,975 A | * | 7/1983 | Moore | 206/385 |
| 4,584,847 A | * | 4/1986 | Martello et al. | 62/293 |
| 5,284,028 A | * | 2/1994 | Stuhmer | 62/457.3 |
| 6,182,854 B1 | * | 2/2001 | Jimenez et al. | 220/705 |
| 6,209,345 B1 | * | 4/2001 | Morton et al. | 62/457.4 |
| RE37,213 E | * | 6/2001 | Staggs | 62/457.3 |
| 6,240,741 B1 | * | 6/2001 | Dozhier | 62/457.3 |
| 6,422,032 B1 | * | 7/2002 | Greene | 62/457.2 |

* cited by examiner

*Primary Examiner*—William E Tapolcai
(74) *Attorney, Agent, or Firm*—Reed Smith LLP

(57) ABSTRACT

A reusable container for frozen goods, and a method of reusably containing ice pops, are disclosed. The reusable container includes at least two telescoping casings having at least an outermost casing that includes an uppermost portion and an innermost casing that includes a lowermost portion, wherein each casing has therein at least one cavity suitably sized for insertion of at least one frozen good into the cavity, and at least one liquid coolant within at least one of the casings. The method includes the steps of telescoping upward at least two telescoping cases to accommodate at least one ice pop, placing the at least one ice pop within the telescoped ones of the at least two telescoping cases, wherein, upon placement of the ice pop within the telescoped ones, the ice pop is at least partially surrounded by a frozen liquid coolant.

23 Claims, 4 Drawing Sheets

US 7,520,140 B2

METHOD AND APPARATUS FOR REUSABLY CONTAINING FROZEN ICE CREAM, ICE POPS, AND THE LIKE

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention is directed generally to a method and apparatus for the containment of frozen goods and, more particularly, to a method and apparatus for reusably containing and/or storing of frozen ice cream, juice pops, and/or the like, which contained and/or stored goods may be targeted primarily to children.

2. Description of the Background

Both children and adults experience a fondness for frozen items, such as ice pops, ice cream, and the like. Frequently, such frozen items attract additional customers, particularly younger customers, by the placement of characters, such as cartoons, on the container that includes therein the frozen item.

However, the frozen item containers employed historically fail to provide for containment of the frozen item therein for more than a fleeting time period. Thus, as society is increasingly on the go, to the movies, to the beach, etc., but it is not typically possible to take frozen items with the person on the go. Hence, enjoyment of frozen items can presently be only fleeting.

Therefore, the need exists for a method and apparatus for containing frozen goods for non-fleeting time periods, to allow for enjoyment of frozen items on the go.

BRIEF SUMMARY OF THE INVENTION

The present invention is directed to a reusable container for frozen goods, including at least two telescoping casings having at least an outermost casing that includes an uppermost portion and an innermost casing that includes a lowermost portion, wherein each casing has therein at least one cavity suitably sized for insertion of at least one frozen good into the cavity, at least one liquid coolant within at least one of the casings, wherein the at least one coolant at least partially surrounds the frozen good upon insertion of the frozen good into the cavity, a resealable seal at the uppermost portion, and a permanent seal at the lowermost portion.

The present invention also includes a method of reusably containing ice pops, including the steps of telescoping upward at least two telescoping cases to accommodate at least one ice pop, placing the at least one ice pop within the telescoped ones of the at least two telescoping cases, wherein, upon placement of the ice pop within the telescoped ones, the ice pop is at least partially surrounded by a frozen liquid coolant, and after placement of the ice pop within the telescoped ones, telescoping downward at least one of the telescoped ones to at least partially expose the ice pop for consumption.

The present invention solves problems experienced with the prior art because it provides a method and apparatus for containing frozen goods for non-fleeting time periods, to allow for enjoyment of frozen items on the go. Those and other advantages and benefits of the present invention will become apparent from the detailed description of the invention hereinbelow.

BRIEF DESCRIPTION OF THE SEVERAL VIEWS OF THE DRAWINGS

For the present invention to be clearly understood and readily practiced, the present invention will be described in conjunction with the following figures, wherein like reference numerals represent like elements, and wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical container system and method. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
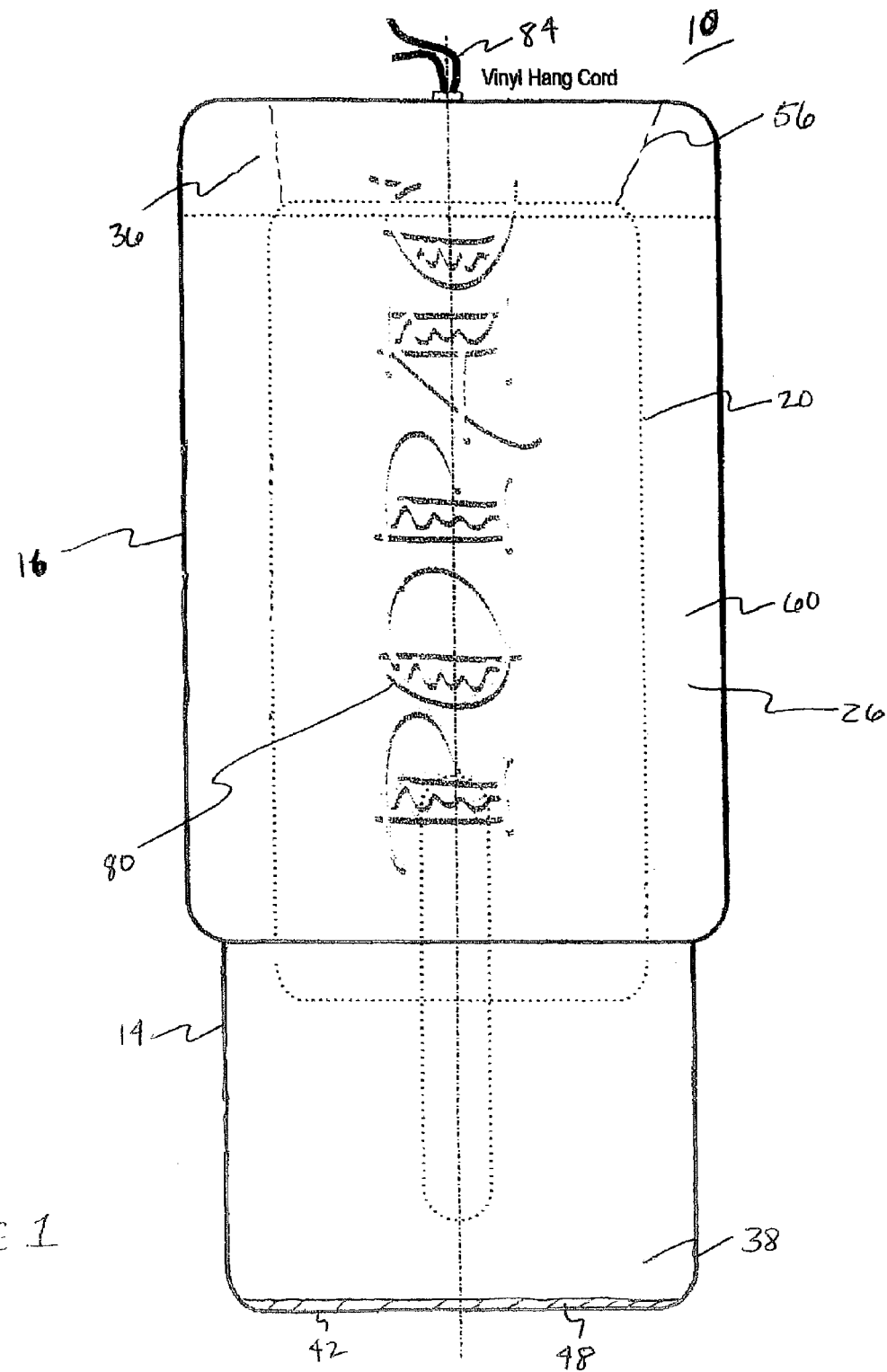
FIG. 1 is a schematic diagram illustrating a telescoping, reusable container pack for frozen goods.

FIG. 1 is a schematic diagram illustrating a telescoping, reusable container pack 10 for frozen goods. It is noted that, as used herein, the terms "ice pop", or "frozen goods", refers to frozen popsicles, ice cream, and the like. The container pack includes at least two telescoping casings 14, 16, and may have therein a cavity 20 for placement of ice pops 22.

The container pack may be a molded plastic container, such as series of molded plastic container casings 14, 16, and may have therein liquid coolant 26, such as that used for freezing in a home freezer unit. The container pack may provide, within the molded plastic container casings 14, 16, at least one rigid or flexible cavity 20 for placement of the ice pop 22, in which the ice pop 22 may be at least partially surrounded with at least a portion of the liquid coolant 26 in order to cool and protect an ice pop for, for example, a time period in the range of 3-4 hours in an exemplary embodiment. There may be multiple cavities 20 within a single container 10, thereby allowing for the containment and storage of multiple ice pops 22.

The container 10 may be formed of a plurality, such as at least two, of the molded plastic container casings 14, 16, wherein each molded container casing 14, 16 of the plurality is sized to fit snuggly and slideably within each successive one of the molded plastic container casings. The inside width dimensions of the telescopic innermost one 14 of the molded plastic casings may provide the limitation on the width of the ice pops that may be accommodated by the overall container pack. The total upward telescoped length of at least two telescoping casings may provide a limitation on the length of the ice pop that may be accommodated. In an exemplary embodiment of the present invention, the telescoping casings preferably accommodate the length of at least a standard length ice pop, such as a length in the range of 4" to 8".

The successive molded plastic casings may provide a top 36 and a bottom 38 of the container 10, which may completely enclose the ice pop in periods of non-consumption of the ice pop, and which top 36 may be telescoped downward to expose a successively increasing portion of the ice pop during periods of consumption. The bottom 38 of the container may be provided by the base 42 of the innermost one 14 of the casings, and may, in a preferred embodiment of the present invention, be permanently sealed 48 so as to provide a firm end point for insertion of an ice pop into the bottom of the cavity adjacent to the bottom 38 of the container.

The permanent seal mechanism at the base of the innermost casing preferably provides an extended life cycle for the container, and may, for example, be provided for in an injection molding of the innermost. casing, by an application of an epoxy or glue to an opening at the base of the innermost casing prior to use, or by other sealing methods that will be apparent to those skilled in the art as suitable for use with the present invention.

The top 36 of the container may preferably be provided by the uppermost portion of the outermost telescoping casing, and may preferably be provided with an open, or a resealable, top opening 56 of the container 10. The resealable top 56 may be provided by an elasticity present at the top seal; by a recloseable portion, such as a velcro, zipper, matched flange, light, reusable adhesive, or other suitable resealant as will be apparent to those of ordinary skill in the art; or by an injection molding to provide a small gap that increases in size when mild pressure is applied by the user to the top of the container, or when mild pressure is applied by the user to the bottom of the container, thereby forcing the ice pop within the container upward. Further, the resealability of the top of the container preferably provides for insertion of ice pops through the top of the container and downward into the telescopic casings without application of undue force to the container or to the ice pop, to thereby prevent breakage of the ice pop or damage to the container, as will be apparent to those skilled in the art.

As discussed hereinabove, the container, and each telescoping casing thereof, may be injection molded. Further, the innermost telescoping casing, or the outermost telescoping casing, or each telescoping casing may have formed therein at least one membrane 60 that provides for the placement of liquid coolant at least partially around the ice pop within the cavity, which coolant, when cooled, may maintain a decreased temperature for the ice pop within the cavity. The membrane 60 may be formed into only a portion of the casing, such as along the sides, and/or along the bottom, of at least one of the casings. The membrane may, for example, be filled with a clear non-toxic coolant 26, such as Perma-Gel®, to provide the extended cooling period. The coolant is preferably non-toxic so as to preclude any physical injury to a user of the container in the event of, for example, leakage or sweating of the liquid coolant. As will be apparent to those of ordinary skill, the container, having therein the liquid coolant, may be stored in, for example, a freezer, in order to lower the temperature of the liquid coolant sufficiently to allow a lowered temperature to be imparted to an ice pop placed within the container once the container is removed from the freezer. Of course, the container may be stored in a freezer with or without an ice pop therein.

In order to form the coolant membrane 60, each telescoping casing may be provided with an innermost ply 70 and an outermost ply 72, and between the two plys of the casing may be present a gap which forms a membrane for the placement of a substance therein. For example, such a membrane may be formed as an ultra-sonic welded membrane, which may be filled with the coolant prior to the final welding closure of the membrane. Thereby, the container of the present invention may also function as a "freezer pack", even without an ice pop present therein, as will be apparent to those skilled in the art.

Alternatively, only a portion of the casing(s) may include two plys, wherein those two plys are sealed together, or each casing may have two plys, but only certain of the portions of the casings may have the two plys sealed together, to form the membrane(s). Thereby, a sidewall, or lower wall, or upper wall liner may be provided to provide the membrane for coolant. In such an embodiment, the liquid coolant may only partially surround the ice pop, such as along the side(s), front, back, bottom, or top of the ice pop within the cavity.

The outermost plys of each of the casings may be more rigid than the innerply of each of the casings, so as to better allow the sliding necessary for telescoping of the casings. The outermost plys, and or the innermost plys, of each casing may be, for example, a translucent plastic, which may provide ease of cleaning, improved durability of the container for repeated reuse, multi-purpose use, and child-proofing. Textured finishing of at least the outer plys may further improve appearance and durability. Additionally, the translucence of the casings may allow for viewing of the ice pop within the container, such as for an assessment of the type, or flavor, of ice pop contained therein. Further, the plys of the casings are preferably dishwasher safe and dishwasher proof.

The translucent plastic may be molded in a range of frosted or bright colors, for example, which may allow for increased visual appeal. This visual appeal may be used to make the container stand out, and hence colors selectable may include, for example, blue, green, orange, or magenta. Further, one or more plys of one or more casings may have molded therein, stamped thereon, and/or branded therein, branding, logos, designs, advertising, characters, or the like 80. In an exemplary embodiment, a raised molding, such as of height in the range of 0.0265", may be molded into the container to provide branding, for example.

The casings may have attached thereto, for example, a handle (not shown) for improved handleability of the container, particularly by small children, and/or at least the outermost casing may have connected thereto a rope or string 84, such as a durable nylon rope, to allow for carrying or hanging of the container.

In a specific exemplary embodiment of the present invention, the container provides the molded plastic cavity formed of the at least two casings, which at least two casings are formed of translucent blue, molded, flexible, injection-molded polypropylene. The polypropylene may be, for example, approximately 0.0625" in thickness, and the outermost casing may be, for example, 3.75"×6.0"×1.875" thick in dimension, and may contain therein, in the membrane provided within the polypropylene, a non-toxic coolant core. An innermost one of the casings may be, for example, 3.25"×4"×1.375" thick in dimension. The translucence of the polypropylene may preferably allow for a viewing of the ice pop within the cavity of the container.

Figure 2:
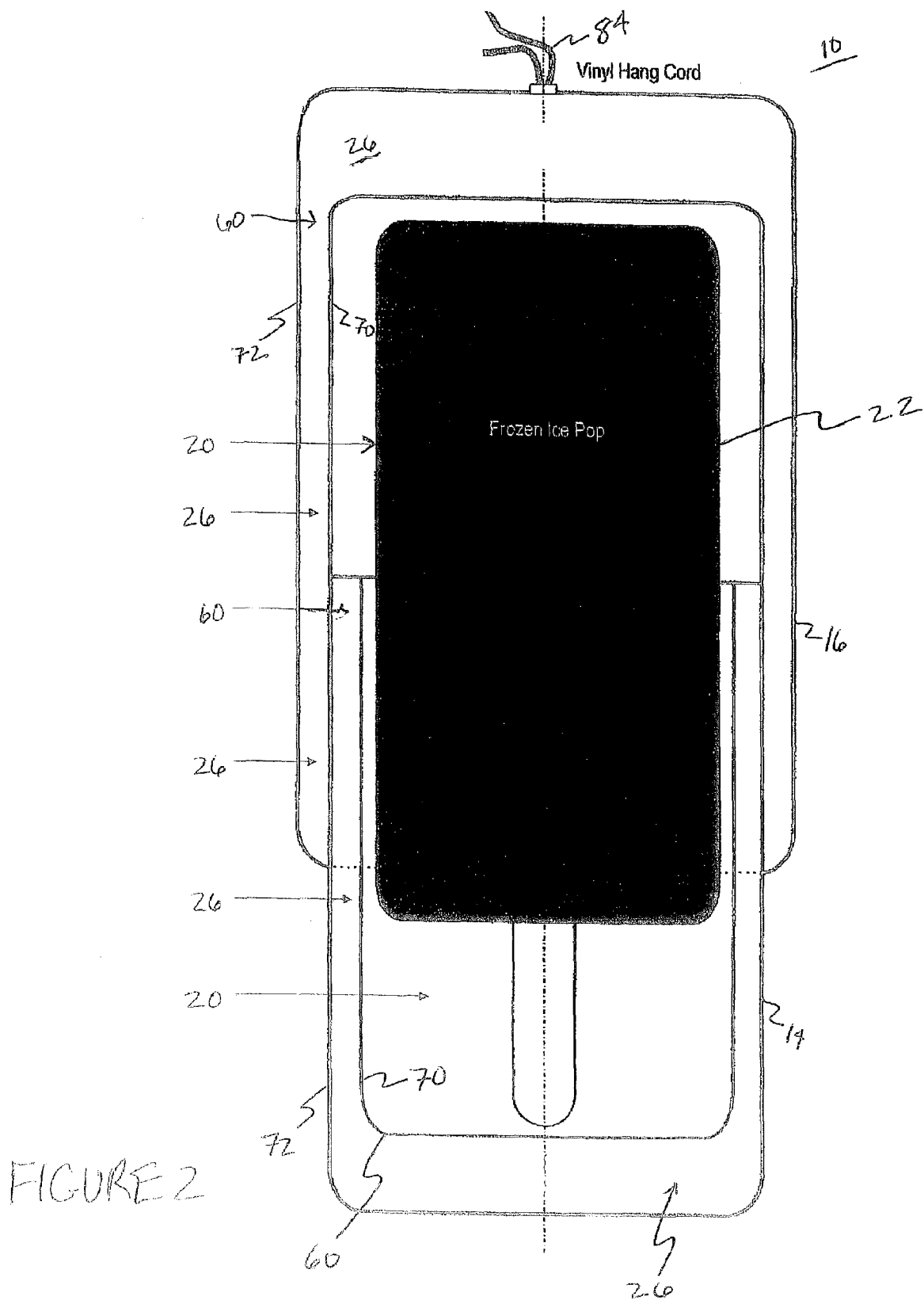
FIG. 2 is a schematic diagram illustrating a telescoping, reusable container pack for frozen goods.

FIG. 2 is a schematic diagram illustrating an exemplary embodiment of the container 10, including, within the cavity 20, an ice pop 22. The cavity provided within the casings is sized dependently upon the sizes of different ice pops to be accommodated. As will be apparent to those skilled in the art, ice pops may vary in size, and hence the cavity within the container may be sized so as to accommodate a great number of ice pop sizes, or only a more limited number of ice pop sizes.

In the specific exemplary embodiment of FIG. 2, the container is provided with coolant 26 present within membranes 60 along the sides and bottom of the innermost one of the casings, and present within the sides and top of the outermost one of the casings. The coolant, upon lowering of the coolant temperature, maintains a decreased temperature of the ice pop within the cavity for an extended time period, such as in the range of 3 to 4 hours.

Figure 3:
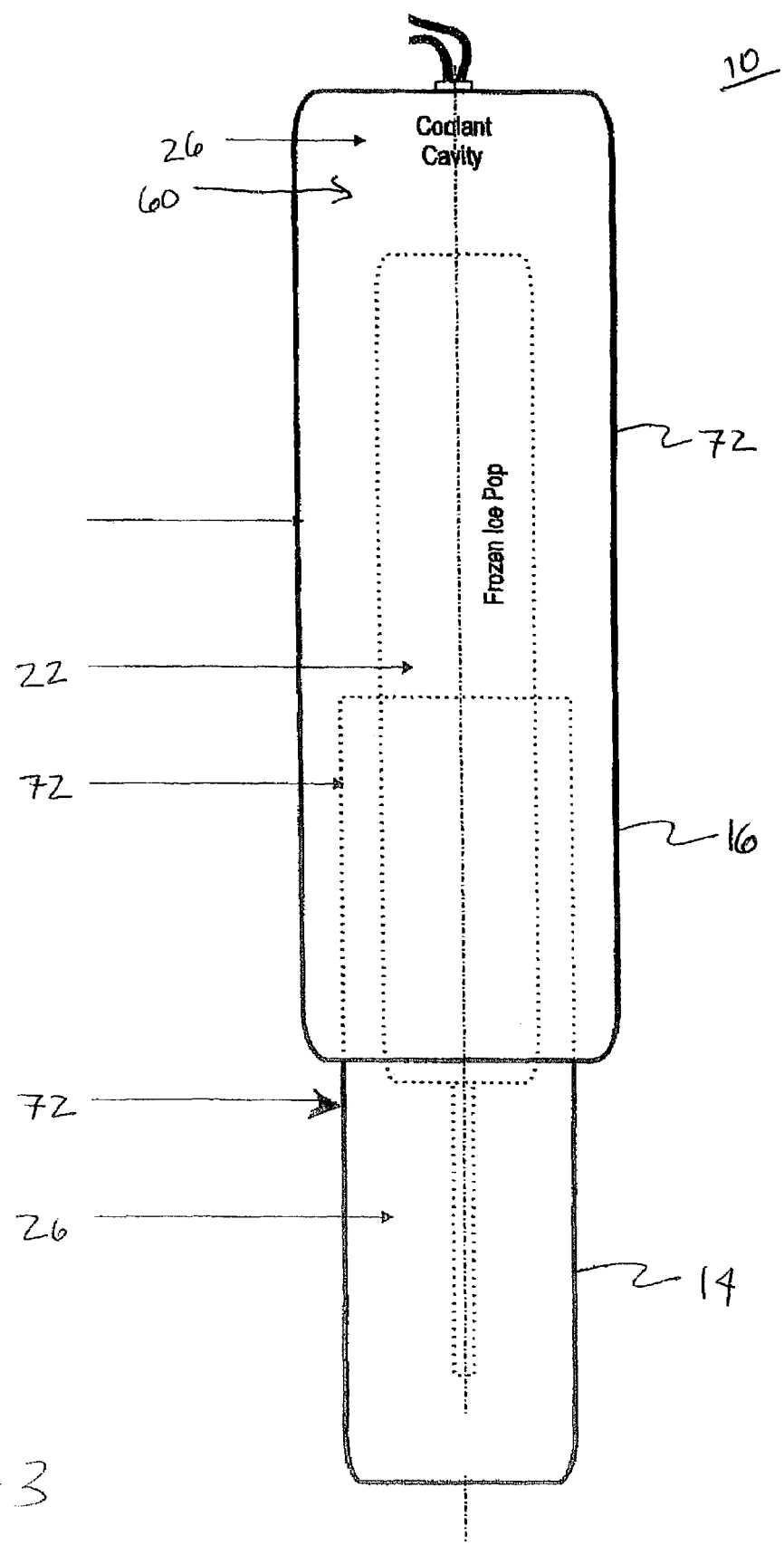
FIG. 3 is a schematic diagram illustrating a telescoping, reusable container pack for frozen goods.

FIG. 3 is a schematic diagram illustrating an embodiment of the container of FIGS. 1 and 2. As shown, the outermost casing is sized to a dimension of 4"×6.25"×2" to accommodate a particular size or type of ice pop, and has a thick matte textured finish for increased durability. Further, as shown, the innermost telescoping casing is sized, for example, to a dimension of 3.25"×4"×1.75" thick, such as to accommodate various size ice pops, with or without a protective wrapper thereon. Thus, FIG. 3 may, for example, illustrate a size variation in the container 10, or may illustrate a side view of the container 10 as shown in FIGS. 1 and 2.

Figure 4:
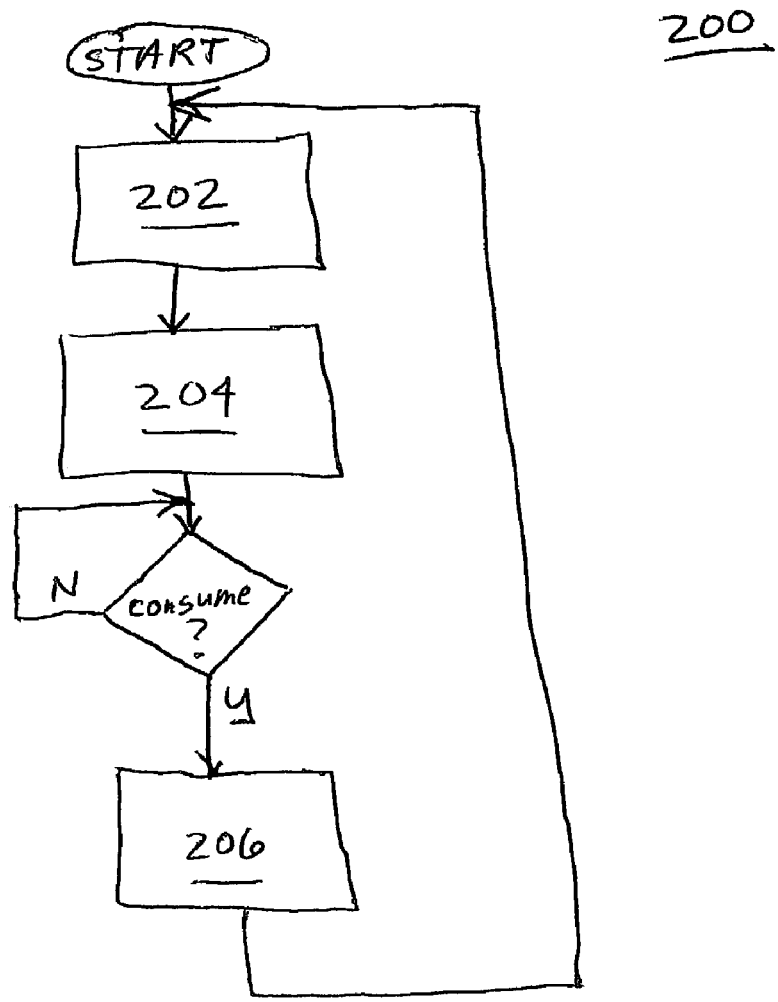
FIG. 4 is a flow diagram illustrating a method of reusably containing ice pops.

FIG. 4 is a flow diagram illustrating a method 200 of reusably containing ice pops. The method 200 includes the steps of telescoping upward 202 at least two telescoping cases to accommodate at least one ice pop, placing 204 the at least one ice pop within the telescoped ones of the at least two telescoping cases, wherein, upon placement of the ice pop within the telescoped ones, the ice pop is at least partially surrounded by a frozen liquid coolant, and, after placement of the ice pop within the telescoped ones, telescoping downward 206 at least one of the telescoped ones to at least partially expose the ice pop for consumption. The method of FIG. 4 may operate substantially in accordance with the discussion hereinabove of FIGS. 1, 2, and 3.

Those of ordinary skill in the art will recognize that many modifications and variations of the present invention may be implemented. The foregoing description and the following claims are intended to cover all such modifications and variations.

What is claimed is:

1. A reusable container for frozen goods, comprising:
an upper casing and a lower casing, said upper casing having an upper casing outer shell and an upper casing internal cavity and a lower aperture at one end of said upper casing and an upper closure at an opposite end of said upper casing;
a lower casing, said lower casing having a lower casing outer shell and a lower casing internal cavity and an upper aperture at one end of said lower casing and a lower closure at an opposite end of said casing;
said upper casing and said lower casing being joined such that said upper casing internal cavity and said lower casing internal cavity form a substantially continuous inner cavity, said inner cavity bounded at one end by said upper closure of said upper casing and at an opposite end by said lower closure of said lower casing;
said upper casing and said lower casing being joined such that said upper casing may be displaced relative to said lower casing to allow said upper casing and said lower casing to be telescopically adjusted to vary the size of the inner cavity;
at least one liquid coolant within at least one of the casings, wherein said at least one liquid coolant at least partially surrounds the inner cavity upon insertion of a frozen good into the inner cavity;
a resealable aperture formed on said upper closure to allow frozen goods to be inserted into said inner cavity.

2. The reusable container of claim 1, wherein said upper casing comprises an inner membrane and an outer shell, and said coolant is disposed between said inner membrane and said outer shell.

3. The reusable container of claim 2, wherein the inner membrane is flexible.

4. The reusable container of claim 1, wherein said lower casing comprises an inner membrane and an outer shell, said coolant being disposed between said inner membrane and said outer shell.

5. The reusable container of claim 1, wherein said upper casing comprises an inner membrane and said lower casing comprises a lower casing outer shell, and wherein a seal is formed between said upper casing aperture and said lower casing outer shell.

6. The reusable container of claim 1, wherein said upper casing comprises an outer shell formed from a thermally insulating material.

7. The reusable container of claim 1, wherein the fully telescoped length is in a range of about 4" to about 8".

8. The reusable container of claim 1, wherein a successive downward telescoping is suitable for successive consumption of the frozen goods.

9. The reusable container of claim 1, wherein the resealable aperture comprises at least one selected from the group consisting of an elasticity of the uppermost portion, a zipper, a matched flange, a reusable adhesive, and a gapped injection molding.

10. The reusable container of claim 1, wherein said liquid coolant comprises a clear non-toxic coolant.

11. The reusable container of claim 1, wherein the outermost casing comprises a handle formed thereon.

12. A reusable container for frozen goods, comprising:
a first casing and a second casing,
said first casing having a center axis and a first casing cavity, said first casing cavity having a first casing cavity cross section, said first casing cavity cross section being substantially constant along said center axis, said first casing having a first casing closure adjacent to a first end of said first casing, said first casing having an opening adjacent to a second end of said first casing; and
said second casing having a second casing center axis and a second casing cavity and an outer cross section, said outer cross section being substantially constant along said second casing center axis, said second casing having a second casing closure adjacent to a first end of said second casing, said second casing having an opening adjacent to a second end of said second casing;
wherein the first casing and the second casing share the same center axis;
wherein said second casing may be telescopically engaged within the first casing cavity of said first casing such that the first end of the first casing and the first end of the second casing are at opposite ends of the shared center axis, said second casing cavity being open to said first casing cavity to form a container internal cavity;
wherein said second casing comprises a coolant surrounding said second casing cavity; and
wherein said first casing closure comprises a resealable opening for placing goods within the internal cavity of the container.

13. The container of claim 12, wherein said second casing comprises an inner membrane and an outer wall, said inner membrane forming the boundary of the second casing cavity, and wherein said coolant is disposed between said inner membrane and said outer wall.

14. The container of claim 12, wherein said coolant comprises a gelatinous chillable fluid.

15. The container of claim 12, wherein said coolant comprises a freezable liquid.

16. The container of claim 12, wherein said inner membrane is flexible.

17. The container of claim 12, wherein resealable opening comprises at least one selected from the group consisting of an elasticity of the uppermost portion, a zipper, a matched flange, a reusable adhesive, and a gapped injection molding.

18. The container of claim 12, wherein the first casing comprises a receiver for receiving a string for hanging said container.

19. The container of claim 12, wherein said first casing comprises an inner membrane and an outer wall, said inner membrane forming the boundary of the second casing cavity, and wherein said coolant is disposed between said inner membrane and said outer wall.

20. The container of claim 12, further comprising a seal located on said first casing adjacent said first casing opening, said seal sealing said first casing to said second casing to prevent the passage of fluids in or out of said inner cavity when said first casing is joined to said second casing.

21. The container of claim 19, wherein said coolant comprises a gelatinous chillable fluid.

22. The container of claim 19, wherein said coolant comprises a freezable liquid.

23. The container of claim 19, wherein said inner membrane is flexible.

\* \* \* \* \*